United States Patent [19]

Calvani et al.

[11] Patent Number: 4,671,657
[45] Date of Patent: Jun. 9, 1987

[54] METHOD OF AND DEVICE FOR REALTIME MEASUREMENT OF THE STATE OF POLARIZATION OF A QUASI-MONOCHROMATIC LIGHT BEAM

[75] Inventors: Riccardo Calvani, Pino Torinese; Renato Caponi; Francesco Cisternino, both of Turin, all of Italy

[73] Assignee: CSELT-Centro Studi e Laboratori Telecomunicazioni Spa, Turin, Italy

[21] Appl. No.: 767,164

[22] Filed: Aug. 19, 1985

[30] Foreign Application Priority Data

Aug. 22, 1984 [IT] Italy .................. 67838 A/84

[51] Int. Cl.$^4$ ............................. G01B 9/02
[52] U.S. Cl. ........................ 356/349; 356/351
[58] Field of Search ................ 356/349, 351

[56] References Cited

U.S. PATENT DOCUMENTS 3,345,907 10/1967 Wada.
3,520,615 7/1970 Smith.
4,553,841 11/1985 Coppa et al. .................. 356/349
4,565,449 1/1986 Grego .................. 356/349 X

OTHER PUBLICATIONS

Article entitled "Optical Communication Conference", Sep. 17-19, 1979—10.3-1-10.3-4.

Primary Examiner—Davis L. Willis
Assistant Examiner—Matthew W. Karen
Attorney, Agent, or Firm—Karl F. Ross; Herbert Dubno

[57] ABSTRACT

Method and device for realtime measurement of the state of polarization at a quasi-monochromatic light beam. Two quasi-monochromatic radiations with slightly different optical frequencies are generated. A radiation is converted into a 45° linearly polarized radiation, while the other presents the polarization state imposed by a body under test. In each radiation, horizontal and vertical polarization components are separated, and then recombined into two different beams comprising radiations at both frequencies, respectively polarized in the same plane. Beatings between the two components of each beam are originated and from the two electrical signals in the radiofrequency range thus obtained the information is extracted on the relative phase and the amplitude of the two components of the radiation with polarization imposed by the body under test.

18 Claims, 4 Drawing Figures

METHOD OF AND DEVICE FOR REALTIME MEASUREMENT OF THE STATE OF POLARIZATION OF A QUASI-MONOCHROMATIC LIGHT BEAM

FIELD OF THE INVENTION

The present invention concerns the measurement of the state of polarization of a light beam, and more particularly it concerns a method and a device for such measurement.

BACKGROUND OF THE INVENTION

It is known that a body traversed by a light radiation can introduce variations in the state of polarization of such a radiation; to characterize the body from its optical-property standpoint, the knowledge of the state of polarization of the radiation outgoing from the body is of importance. This knowledge is essential when exploiting interference or beating among radiations, since these phenomena occur ony when the radiations have the same polarization. Beside the well known applications of classical optics, optical coherent or heterodyne telecommunications (based on a beating) can be cited, as well as optical fiber sensors or gyroscopes, requiring the use of fibers maintaining a determined state of polarization.

A polarized radiation can be characterized by the electromagnetic field components in an orthogonal reference system x, y. Taking into account only the electrical field, the two components are:

$$E_x = a_1 \cos \omega t$$

$$E_y = a_2 \cos (\omega t + \phi)$$

where $a_1$, $a_2$ are the amplitudes of the two components and $\phi$ is the relative phase. To determine the state of polarization it is necessary to measure the ratio $a_2/a_1$ between the two amplitudes and phase $\phi$, whose sign defines the rotation direction on the polarization image (described on plane Ex, Ey, as t varies). It is also to be taken into account that the state of polarization can vary in time: this usually occurs in systems using optical waveguides, owing to variable mechanical and thermal stresses which modify the optical properties of the transmitting medium.

Devices are already known for the measurement of the state of polarization of a beam under non-stationary conditions. An example is described by R. Ulrich in the paper entitled "Active Stabilization of Polarization on Single-Mode Fiber" presented at the Optical Communication Conference, Amsterdam, Sept. 17-19, 1979 and published at pages 10.3-1 and ff. of the conference records. In this known device, the state of polarization at a fiber output is measured and compared with a desired state, for polarization stabilization purposes. For measuring the actual state a small fraction of the beam emerging from the fiber is extracted by a beam splitter and split into two nearly equal parts. One of these parts is passed through a λ/4 plate, split again into two parts, thus allowing the analysis of the left/right circular components; the other too is split into two parts and is used to analyse the ±45° linear components. The two pairs of beams thus obtained are sent to two pairs of detectors whose output signals are processed in analog circuits supplying on the so-called Poincare sphere the coordinates of the state of polarization, which depend in a known way on the above-cited parameters.

This known device has the disadvantage of presenting rather slow and imprecise processing circuits and gives rise to receivers sensitivity problems, as phase measurements are made as intensity measurements (direct detection) and under particular conditions they can produce severe angular errors.

OBJECT OF THE INVENTION

The present invention therefore aims to provide a rather simple method and device, which allow real-time measurement, without giving rise to measurement sensitivity problems, and which can be conveniently used for both stationary and non-stationary beams.

SUMMARY OF THE INVENTION

According to the invention, two quasi-monochromatic radiations with slightly different optical frequencies are generated. One radiation is converted into a 45° linearly-polarized radiation, while the other radiation presents the polarization state imposed by a body under test. In each radiation, horizontal and vertical polarization components are separated, and then recombined into two different beams comprising radiations at both frequencies, respectively polarized in the same place. The optical signals are converted to electrical signals and the state of polarization is determined from the relative phase and the amplitude of the two components.

BRIEF DESCRIPTION OF THE DRAWING

The invention will become more apparent with reference to the annexed drawings which show some embodiments of the invention given by way non-limiting examples. In the drawings.

In such figures double lines indicate electrical connections and single lines indicate light beam paths.

SPECIFIC DESCRIPTION

Figure 1:
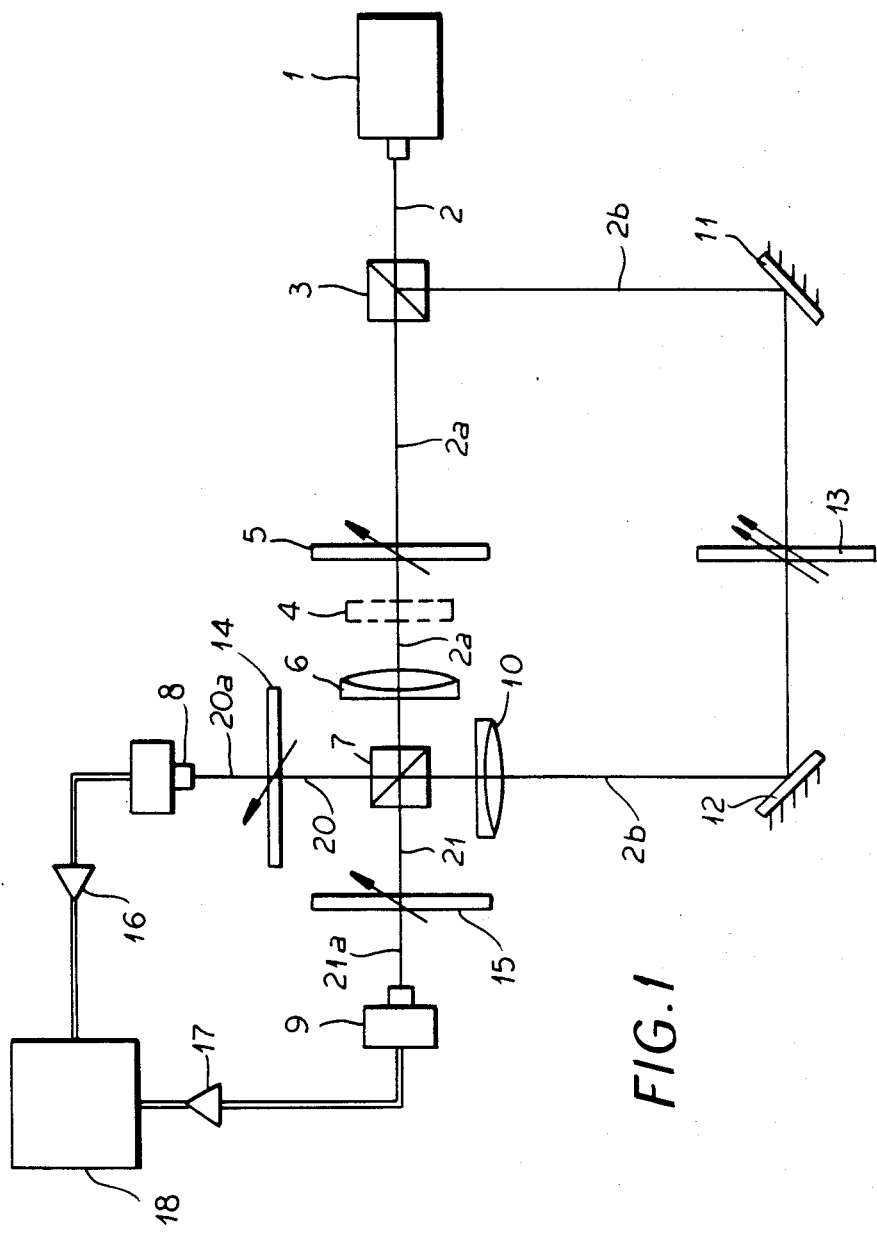
FIG. 1 shows a first embodiment using a source generating the two frequencies necessary to the measurement.

Referring to FIG. 1, forming means for generating first and second quasi-monochromatic light radiation, a light ray source 1 emits a substantially collimated beam, comprising two spatially separable and very well defined radiations with optical frequencies $\omega_1$, $\omega_2$ (i.e. radiations such that their spectral lines have a width which is much less than the distance thereof). In particular source 1 can be a Zeeman effect He-Ne laser which generates two radiations separated by an interval of the order of the MHzs, linearly polarized in orthogonal planes. Source 1 is followed by a device 3, a means for directing, which splits the radiations polarized in the two planes and sends them along two different paths. Body 4 under test is placed along one of such paths (polarimeter measurement branch) and imposes to the beam passing through it the state of polarization to be determined; the other path (reference branch) produces a reference radiation which is then made to beat with the radiation outgoing from the measurement branch, as will be seen hereinafter. Polarization splitter 3 may be for instance Glan-Taylor prism. In this case, by the arrangement shown in the Figure, radiation 2a with frequency $\omega_2$, polarized in the vertical plane, is fed to the measurement branch while radiation 2b with frequency $\omega_1$, polarized in the horizontal plane, is sent into the referenced branch.

The measurement branch comprises, between body 4 and splitter 3, a polarizer 5 (possibly only during a polarimeter calibration phase) which converts the radiation passing through it into a linearly-polarized radiation at 45° with respect to the vertical plane. The radiation emerging from polarizer 5 (during the calibration phase) or from body 4 is sent, through an achromatic doublet 6 and a polarizing beam splitter 7, to a pair of detectors 8, 9, both placed at focal distance from achromatic doublet 6 and from a second achromatic doublet 10 located in the reference branch. Polarizing beam splitter 7 receives also the radiations from the reference branch and presents two input faces and two output faces. It emits a beam 20, comprising for instance the horizontal components of the radiation from the measurement branch and the vertical component of the radiation from the reference branch, and a beam 21 resulting from the opposite combination.

The reference beam is sent to doublet 10 and to splitter 7 through two mirrors 11, 12 and a compensation device 13, forming means for converting, with two freedom degrees, e.g. a Soleil-Babinet compensator or a polarizer associated with a quarter wave plate. Mirror 12 is at focal distance from doublet 10. The mirrors are mounted on supports allowing their displacements for fine adjustments of the reflected beam direction. More particularly, mirror 12 can be rotated about two orthogonal axes and translated towards, splitting/combining means, splitter 7. Device 13 is to compensate possible modifications of the state of polarization introduced by splitter 7 and possibly by the mirrors, and to rotate by 45° the polarization plane of radiation 2b, so as to supply the input of device 7 with a 45° linearly polarized radiation. Achromatic doublet 10 of the reference branch, besides focussing the light beam onto detectors 8, 9, allows, thanks to mirror movements, an independent control of the position and of the incidence angle of the two components of beam 2b on the detectors, so as to obtain the perfect superposition with the components of beam 2a. In other words, doublet 10 prevents a rotation or a translation of mirror 12 from altering the incidence angle or the image position, respectively, on the detector surface.

A first and second polarizing means comprising two polarizers 14, 15 with parallel axes are located in the paths of beams 20, 21 emerging from device 7 and equally polarize the two components of the beams which traverse them (e.g. 45° polarizations). The beams 20a, 21a emerging from polarizers 14, 15 are collected by first and second detection means, detectors 8, 9 which detect the beatings between the two components of each beam, emitting radiofrequency signals with frequency equal to the difference between the two optical frequencies generated by source 1.

The output signals of such detectors have an amplitude proportional to $a_1$ and $a_2$ and relative phase $\phi$. In fact, at the output of body 4, the electric field to be measured may be represented as:

$E_{Mx} = a_1 \exp(i\omega_1 t)$ $E_{My} = a_2 \exp[i(\omega_1 t + \phi)]$ while the reference electric field, immediately before device 7, can be represented as:

$E_{Rx} = (E_0/\sqrt{2}) \exp[i(\omega_2 t + \phi_R)]$ $E_{Ry} = (E_0/\sqrt{2}) \exp[i(\omega_2 t + \phi_R)]$ where $\phi_R$ indicates a global phase which takes into account the difference of optical paths between measurement beam and reference beam. Recombination produces at the output of device 7 two beams 20, 21 characterized repsectively by fields:

$E_x(20) = a_1 \exp(i\omega_1 t)$ $E_y(20) = (E_0/\sqrt{2}) \exp[i(\omega_2 t + \phi_R)]$ $E_x(21) = (E_0/\sqrt{2}) \exp[i(\omega_2 t + \phi_R)]$ $E_y(21) = a_2 \exp[i(\omega_1 t + \phi)]$ Hence, the intensities at the inputs of the two detectors 8, 9 after polarizers 14, 15 are:

$I(8) = I_0 + (E_0/\sqrt{2})a_1 \cos[(\omega_1 - \omega_2)t - \phi_R]$ $I(9) = I_0 + (E_0/\sqrt{2})a_2 \cos[(\omega_1 - \omega_2)t + \phi - \phi_R]$.

where $I_0$ and $I_0$ are undetected d.c. levels. So, beatings at frequency $\omega_1 - \omega_2$ have amplitudes proportional to a1 and a2 and relative phase $\phi$, like the field to be measured. Signals I(8), I(9) are then amplified in amplifiers 16, 17 and fed to a measurement and/or display device 18 (e.g. a vector voltmeter or a sampling oscilloscope operating in x-y mode, or a combination of both devices). If device 18 is a vector voltmeter the digital values of a2/a1 and $\phi$ (in sign and absolute value) are obtained; if device 18 is a display the visualized trace offers an information proportional to the amplitude and reproduces the shape of the polarization figure. Besides, the choice of a suitable sampling time allows the visualization of the trace path direction.

The measurement of the state of polarization of a beam by the device described is carried out in two phases: the first is a calibration phase of the device, in the absence of the body under test, to be effected once for all, the second is the actual measurement phase.

During the calibration phase two radiations with equal amplitudes and phases are to be sent to the two inputs of device 7. To this aim the radiation polarized in the vertical plane, sent through splitter 3 into the measurement branch, is converted by polarizer 5 into a 45° linearly polarized radiation. In the reference branch compensator 13 is acted on until device 18 gives either a trace formed by a straight line at 45° or values $a_2/a_1 = 1$, $\phi = 0$, depending on the kind of device: i.e. also the reference branch supplies a 45° linearly polarized radiation and all delays and attenuations produced by either branch are actually compensated so that the polarimeter is calibrated. Under these conditions the polarimeter is ready for any subsequent measurement, which is supposed to be performed in the absence of polarizer 5.

During the measurement phase, the reference branch keeps unchanged. In the measurement branch, a radiation with vertical linear polarization is present at the input of body 4, and generally an elliptical polarization defined by the body properties is obtained at the output. In splitter 7 horizontal component Ex of the radiation at frequency $\omega_2$ is superimposed to the vertical component of the radiation emerging from the reference branch. Polarizer 14 linearly polarizes the two components in the same plane at 45° to the horizontal. The intensity I(8) of the beam obtained by the combination of the two components at different frequencies contains a beating term oscillating at frequency $\omega_2-\omega_1$, with amplitude proportional to the component product. This amplitude modulation, transformed into current signal by detector 8, is supplied to the measurement and/or display device 18.

The same situation occurs for the other output of splitter 7. Polarizer 15 linearly polarizes the vertical component Ey of the radiation at frequency $\omega_2$ and the horizontal component of the radiation at frequency $\omega_1$ in the same plane parallel with the plane of polarization of the radiations emerging from polarizer 14. The parallelism between the two polarizers is necessary for the intensities of the two signals to be dependent on the amplitudes of the two components of the field according to the same proportionality factor. Detector 9 detects a second beating which is supplied to device 18 which displays the polarization state or gives the values of parameters $a_2/a_1$, $\phi$. The measurement is hence performed in a beating cycle, and, owing to the frequencies involved, is practically in real time. It is worth noting that, thanks to the fact that each of the two beams 20, 21 contains both a fraction of the radiation transmitted on the measurement branch and a fraction of the radiation present on the reference branch, the measurement effected remains insensitive to possible phase shifts, e.g. of mechanical or thermal nature, which can arise on the two branches.

Figure 2:
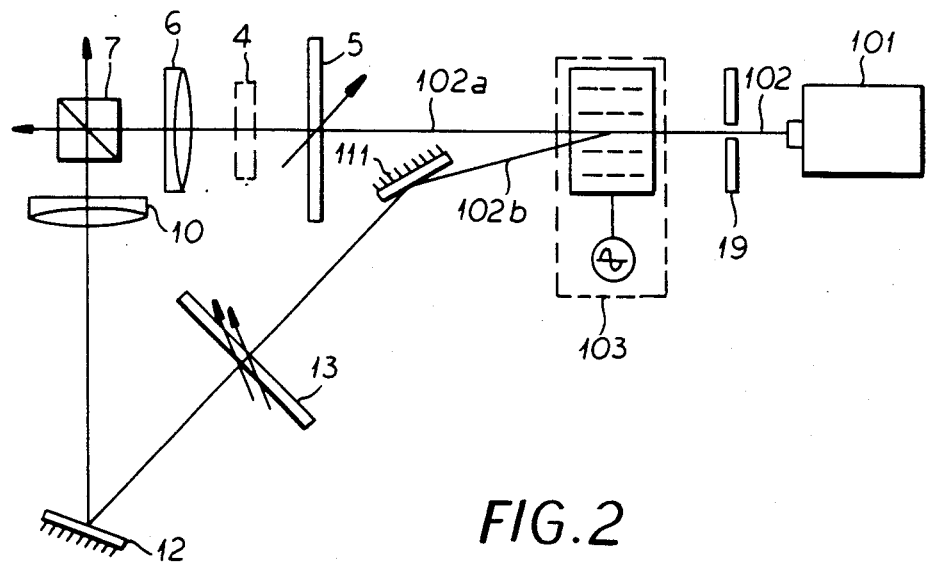
FIG. 2 shows an alternative embodiment, making use of an acousto-optic device for generating the two frequencies.

In the alternative embodiment of FIG. 2 the way in which the two frequencies are generated and separated has been modified. Source 101 is in this case a laser, e.g. a He-Ne laser, which generates a beam 102 comprising single-frequency radiations. To generate the two frequencies necessary to the measurement, an acousto-optic frequency shifter 103 is inserted along the path of beam 102 and produces a first beam 102a with frequency equal to the frequency of beam 102, and a second beam at a frequency given by the sum or the difference (depending on how acousto-optic frequency shifter 103 is used) between the optical frequency of original beam 102 and the radiofrequency fed to 103 (of the order of some ten MHzs). The two beams have the same polarization. The first beam is sent into the measurement branch and the second is sent into the reference branch through mirror 111. An iris 19 is inserted between source 101 and acousto-optic device 103 eliminates reflections on the surface of device 103, which could alter the measurement.

The remaining part of the device is identical to that of Fig. 1. Also the operation is identical to that of the scheme of FIG. 1. The initially equal polarization of the two radiations has no effect, owing to the presence of compensator 13, which gives rise to a 45° polarization.

Figure 3:
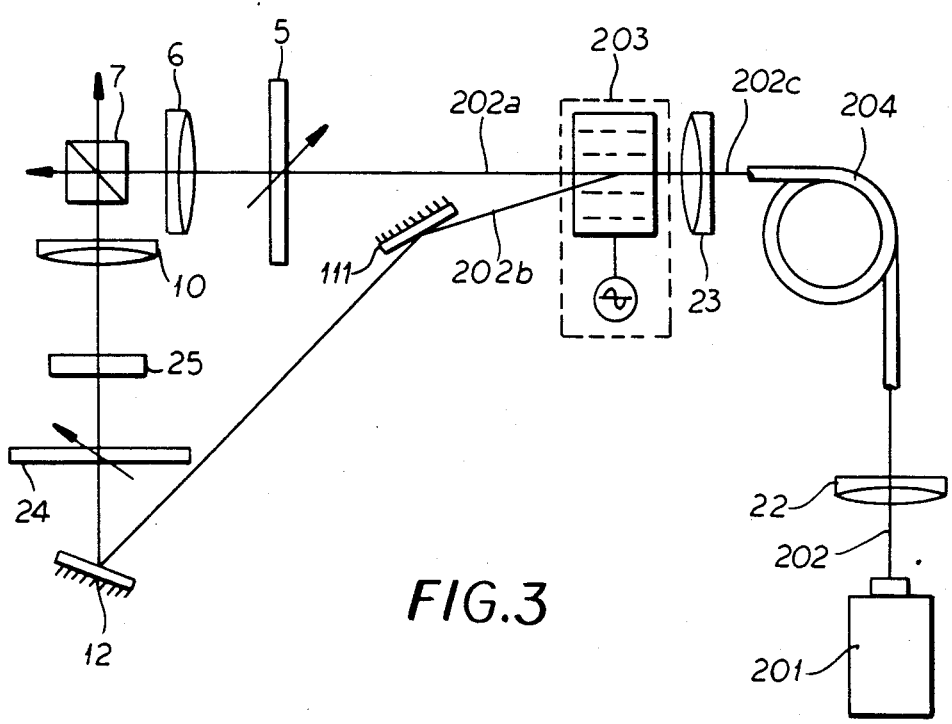
FIG. 3 shows a third embodiment, particularly suitable to measurements on optical fibers.

In the schemes of FIGS. 1 and 2 it has been implicitly supposed that the dimensions of body 4, in the direction of beam 2a or 102a, are such as not to introduce optical path differences between the two branches comparable with the coherence length of sources 1, 101. In case of measurements on optical fibers if a semiconductor laser is used as a source, the length of the trunks to be measured can easily cause such a limit to be exceeded: thus, if the line width of the laser exceeds the radiofrequency of the beating, a precise phase relation no longer exists between the radiations arriving at the two input faces of device 7. Theoretically, a fiber trunk could be inserted also in the reference branch, but the radiation on such a branch might become less controllable. Hence it is simpler to insert the fiber before the frequency separating means, as shown in FIG. 3. In this case source 201 is e.g. a longitudinal monomode semiconductor laser operating in the infrared range. Output beam 202 is focused on the input of fiber 204 under test by an optical system, schematized by achromatic doublet 22, and beam 202c outgoing from fiber 204 is sent, through another achromatic doublet 23, to acousto-optic device 203, identical to device 103 of FIG. 2, which generates the two beams 202a, 202b. By this arrangement, the beams outgoing from the two branches have the same state of polarization, corresponding to the state at the fibre output. It is then necessary to introduce into one of the branches a device apt to produce a reference for the state of polarization to be measured.

This device is obtained for instance by inserting polarizer 24 into the branch followed e.g. by beam 202b (which for the sake of simplicity will still be referred to as "reference branch") to force a 45° linear polarization on such a beam. The reference branch comprises a quarter wave plate 25 to compensate polarization changes introduced by device 7. Polarizer 24 and $\lambda/4$ plate 25 act together as compensator 13 of FIGS. 1, 2.

As to the operation, at the output of acousto-optic device 203 two radiations 202a, 202b are obtained with the same polarization, which yet depends on fibre characteristics. In the reference branch, the polarization is converted into a 45° linear polarization by polarizer 24, and the remaining operations are identical to those of the previous embodiments. It is to be underlined that in this arrangement polarizer 5 of the measurement branch must be present only during the calibration phase, otherwise it would annul the signal to be measured.

Figure 4:
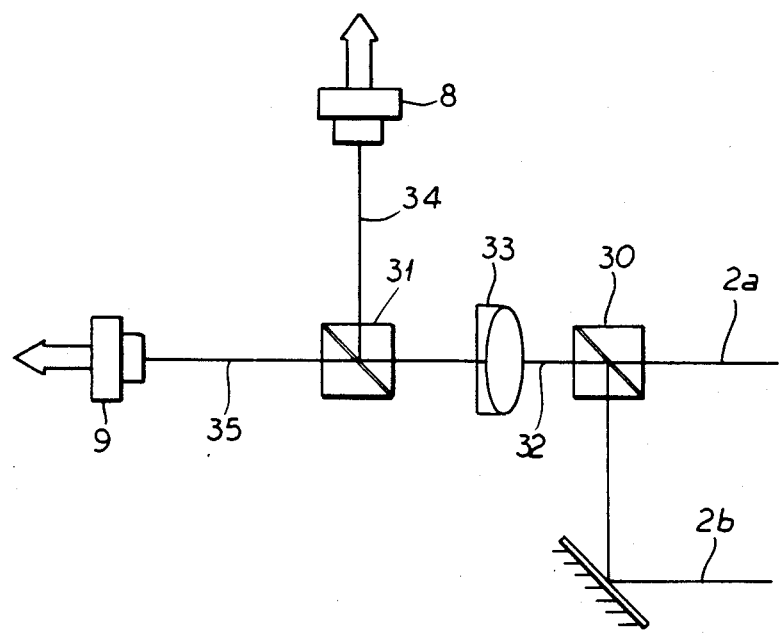
FIG. 4 shows a variant of the means for separating and recombining the different polarization components.

In the further variant shown in FIG. 4, polarizing beam splitter 7 has been replaced by two separate units, namely a cube beam splitter 30 and polarizer (in particular a Glan-Taylor prism) 31. Beam splitter 30 emits from an output face a single recombined beam 32 comprising a fraction of the beams from both branches; the remaining fraction, outgoing from the perpendicular face of beam splitter 30, is not of interest. Beam 32 passes through an achromatic doublet 33 and is fed to Glan-Taylor prism 31 which splits beam 32 into a beam 34 comprising the components with horizontal polarization of the beams from the two branches and a beam 35 comprising the components with vertical polarization. Beams 34, 35 are sent to detectors 8, 9 placed at focal distance from doublet 33. Also mirror 12 is at focal distance from doublet 33.

Clearly compensator 13 (FIG. 1) or polarizer 24 and plate 25 (FIG. 3) can be indifferently used in all the schemes.

It is to be appreciated that in order to simplify the drawings, the reflecting surfaces of Glan-Taylor prisms 3, 31 have been shown inclined by 45°, even if actually the angle is different.

We claim:

1. A method for realtime measurement of the state of polarization of a quasi-monochromatic light beam comprising the steps of:

generating a first and second quasi monochromatic light radiation having slightly different frequencies;

directing said first radiation along a reference branch;

directing said second radiation along a measurement branch;

converting said first radiation in said reference branch into a fixed reference oriented linearly-polarized radiation;

splitting said fixed reference radiation into two equal first components with horizontal and vertical polarization forming reference horizontal radiaton and reference vertical radiation;

directing said second radiation through a transparent body under test forming test radiation, splitting said test radiation into two second components with horizontal and vertical polarization forming test horizontal radiation and test vertical radiation;

combining said reference horizontal radiation with said test vertical radiation forming a first beam;

combining said reference vertical radiation with said test horizontal radiation forming a second beam;

converting said first beam and said second beam into first and second electrical signals respectively; and analyzing said first and second electrical signals for relative phase and amplitude ratio.

2. A method as defined in claim 1 wherein said first and second beams are directed along different paths and polarizing said beams into a common plane.

3. A method as defined in claim 1 wherein said first radiation and said test radiation are combined into a single beam, separating said horizontally polarized components from said vertically polarized components of said first radiation and test radiation, combining said vertically polarized components and said horizontal components respectively to form said first and second beams.

4. A method as defined in claim 1, further comprising a calibration step in which said radiations sent into said reference and test branches are converted into radiations of equal amplitude and phase, which radiations are linearly polarized with the same fixed orientation such as to allow the splitting into equal components with horizontal and vertical polarization.

5. A method as defined in claim 1 wherein said first and second monochromatic radiations are generated by a common source and present orthogonal linear polarizations.

6. Device for measuring state of polarization of a light beam comprising:

means for generating a first and a second quasi-monochromatic light radiation having slightly different frequencies;

means for directing said first and said second radiations along reference branch and measurement branch respectively;

means for converting said first radiations along said reference path into linearly-polarized radiation with fixed orientation;

splitting/combining means for splitting said first radiation and said second radiation wherein said first radiation is split into a vertical reference component and a horizontal reference component, said radiation is split into a vertical test component and a horizontal test component, said horizontal test component being combined with said vertical reference component forming a first beam and said horizontal reference component being combined with said vertical test component forming a second beam;

first polarizing means for said first beam and second polarizing means for said second beam wherein radiations of said first beam and second beam are linearly polarized in a same plane;

first and second detecting means for transforming said first and second beams into a first signal and a second electrical signal; and analyzing means coupled to said first and second detecting means for measuring phase and ratio of amplitudes between said first and second electrical signal.

7. A device as defined in claim 6 wherein said reference branch comprises at least one mirror mounted on a support allowing the rotation about two axes and a translatory movement for moving it nearer to or farther from said first splitting/combining means and in that said mirror and said first and second detection means are placed at a focal distance from a first optical system, allowing an independent control of position and of incidence angle on said detector means of said two components of the radiation which has gone through the reference branch.

8. A device as defined in claim 6 wherein said splitting/combining means comprises a beam splitter receiving on a first face said first radiation from said measurement branch and on a second face said second radiation from said reference branch and combining said two radiations into a single beam, and a third polarizing means separating said single beam into horizontally and vertically polarized components forming said first and said second beam.

9. A device as defined in claim 6 wherein said splitting/combining means comprises a single polarizing beam splitter which combines said horizontal test component with said vertical reference component and said horizontal reference component with said vertical test component.

10. A device as defined in claim 7 wherein said first optical system is inserted in said reference branch between said mirror and said splitting/combining means and said first and second detecting means are placed at focal distance from a second optical system analogous to said first optical means and inserted into the measurement branch.

11. A device as defined in claim 6 wherein said measurement branch comprises, at least during a calibration phase, a calibration polarizer which converts said second radiation into a radiation having a linear polarization identical to that of said first radiation having gone through the reference branch.

12. A device as defined in claim 6 wherein means for directing said first and second radiations at the two frequencies comprises a source and a polarization splitter.

13. A device as defined in claim 7 wherein said first and second radiations are linearly polarized in perpendicular planes.

14. A device as defined in claim 6 wherein said means for generating and for directing comprises a source of a quasimonochromatic light radiation and an acousto-optic frequency shifter which obtains from said light radiation radiations at two frequencies.

15. A device as defined in claim 6 wherein a body under test is inserted into said measurement branch.

16. A device as defined in claim 15 wherein said body under test presents, in the direction of the light radiation it is traversed by, dimensions to be compared to the source coherence length, the reference branch comprises a standard sample body with controlled characteristics, such that the difference among the optical paths of the radiations going through said two branches is negligible with respect to said coherence length.

17. A device as defined in claim 6 wherein means for converting consists of a Soleil-Babinet compensator.

18. A device as defined in claim 7, further comprising an acousto-optic frequency shifter.

* * * * *